Patented Oct. 11, 1932

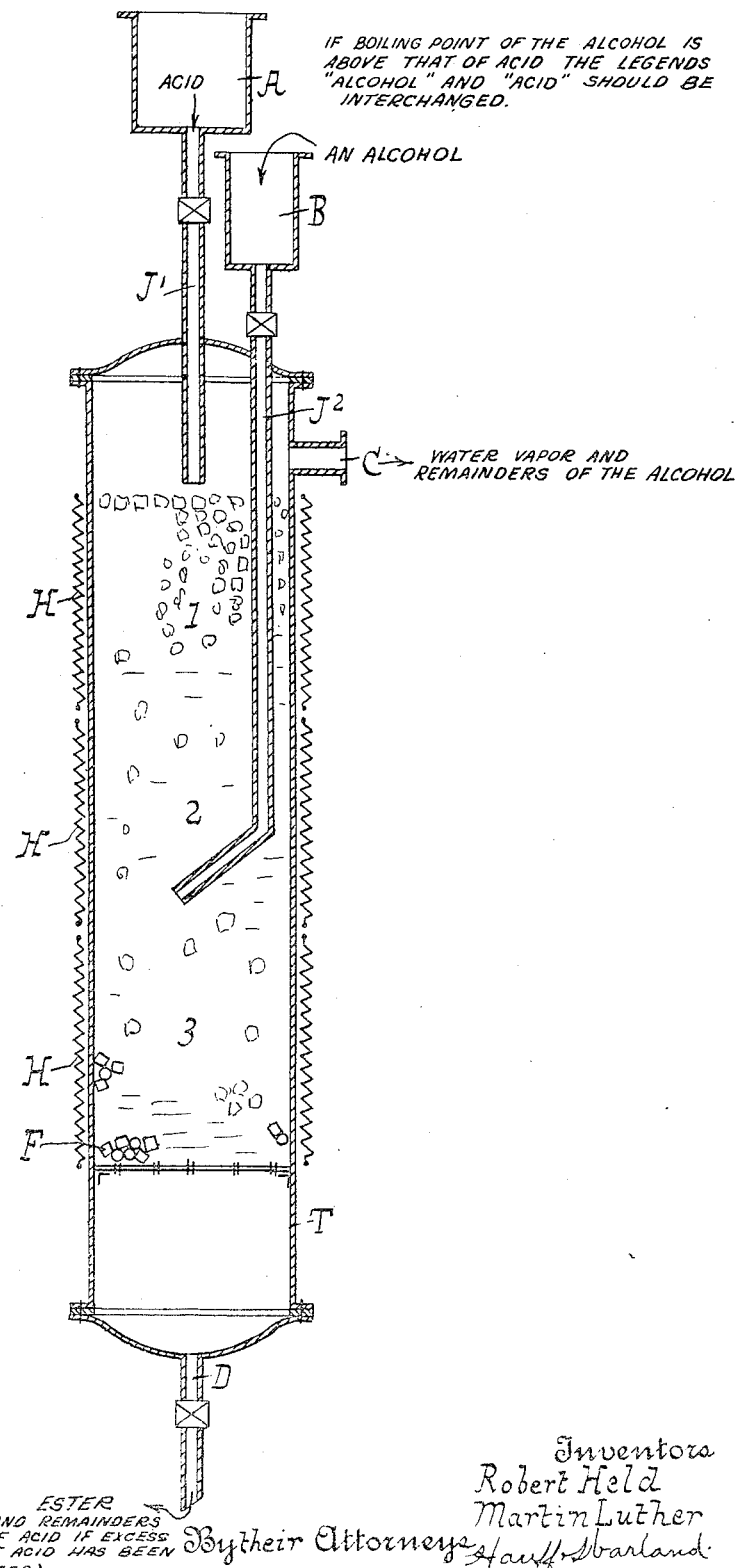

1,881,563

UNITED STATES PATENT OFFICE

ROBERT HELD, OF OPPAU, AND MARTIN LUTHER, OF MANNHEIM, GERMANY, ASSIGNORS TO I. G. FARBENINDUSTRIE AKTIENGESELLSCHAFT, OF FRANKFORT-ON-THE-MAIN, GERMANY

PRODUCTION OF ESTERS

Application filed November 30, 1929, Serial No. 410,773, and in Germany December 15, 1928.

The present invention relates to the production of esters.

In the method of working hitherto usually employed the esterification of organic acids with alcohols, for example of higher fatty acids with glycerol, takes place very slowly, and in practice, even when employing a vigorously operated stirring device, comparatively long periods of time are necessary for carrying out the reaction.

We have now found that the esterification can be advantageously carried out by causing the acid and the alcohol to flow in the liquid phase over solid bodies possessing a large superficial area while heating. In consequence of the fine dispersion of the liquids which is thus produced and in consequence of the intimate mixing of the liquids with each other a considerable acceleration of the reaction is effected; moreover, by the provision of large surfaces the process is considerably facilitated as regards the removal of the water formed during the reaction. Bodies of an inert material for example rings, balls or lumps of glass, porcelain, coke or pumice and the like, or sieves may be employed and also such bodies which consist of or comprise catalytically active substances accelerating the removal of water and thereby reducing the temperature of working, such as alumina, active carbon and the like. Catalysts such as salts of the higher fatty acids may also be mixed with the reacting components. It is advantageous to operate with the employment of a vacuum.

By the processes hitherto known for the manufacture and production of esters from alcohols and acids, for example of glycerides of higher fatty acids, it has been usual to work with an excess of alcohol or an excess of acid in order to obtain neutral products, and in each case the excess is removed from the reaction mass at the end of the reaction in any known and suitable manner.

A practically neutral esterification product which is also free from non-esterified alcohol may be obtained according to the present invention when the acid and the alcohol are employed in such amounts that the component having the lower boiling point is present in excess, the reacting components being led, preferably in a continuous operation, through reaction zones provided with bodies possessing a large superficial area, as hereinbefore described, the temperatures of the said zones being increased in stages in the direction of flow of the liquids, the temperature of at least the last zone being above the boiling point of the component of lower boiling point but below the boiling point of the component of higher boiling point at the pressure employed.

The nature of this latter method will be further described with reference to the accompanying drawing which shows diagrammatically an arrangement of apparatus according to this invention, but the invention is not restricted to this arrangement.

The apparatus comprises a closed reaction tower T provided at its top with inlet pipes $J_1$ and $J_2$ connected with storage vessels A and B, the inlet pipe $J_2$ reaching down to about the bottom of the middle zone 2 of the tower, the tower being charged with acid proof bodies F possessing a large superficial area and is provided with external (or internal) means H for electric heating subdividing for example the interior of the tower into zones 1, 2 and 3. The tower T is further provided near its top with an outlet C and near its bottom with an outlet pipe D. The process in accordance with the present invention may be carried out for example by introducing the acid, which is to be esterified, from the vessel A through the inlet pipe $J_1$ at the top into the reaction zone 1, while the alcohol is introduced from the vessel B through the inlet pipe $J_2$ into the reaction zone 2 which is heated to a higher temperature than the reaction zone 1. For example in the manufacture of glycerides of higher fatty acids the temperature in the zone 1 is kept at about 160° C. and in zone 2 at about 190° C. In this case the glycerol vapour rising from the zone 2 meets the hot fatty acid, and in this manner a combination of the glycerol by esterification with the splitting off of water takes place and the water streams out through the outlet C in the form of steam. The removal of the water from the reaction chamber may be facilitated by connecting the outlet C with an evacuating device. The esterification of any free acid which may still be present takes place in the lower zone 3, which is heated to a temperature of from 220° to 230° C. where at the same time any glycerol which is carried along with the reaction product flowing down from the reaction zones 1 and 2 is vapourized. The glycerol vapour streams back into the upper part of the tower. The reaction product is withdrawn from the bottom of the tower through the pipe D, and it constitutes a practically acid-free neutral oil. A special advantage of the process in accordance with the present invention resides in the fact that in contrast to the processes already known the reacting materials are only exposed to high temperatures for a comparatively short period of time and are therefore protected to a very great extent.

The following examples will further illustrate the nature of this invention, but the invention is not restricted to these examples. The parts are by weight.

Example 1

500 parts of olive oil fatty acid which are incorporated with 0.1 per cent of tin oleate dissolved therein and 100 parts of glycerol are introduced during a period of two hours into a reaction tower the ratio of the diameter to the height of which is about 1 to 10 and which is charged with granular coke and heated to a temperature of from 180° to 200° C. The pressure prevailing in the tower amounts to from 10 to 20 millimetres of mercury. The ester formed is withdrawn at the lower part of the tower, and is washed and freed from the remainders of free acid. The remainders of glycerol are carried off together with water vapour and can be recovered in any suitable manner. Instead of the fatty acids of olive oil an olive oil containing free acids may also be employed.

Example 2

A reaction tower, similar to that shown in the drawing, the height of which is about 10 times the diameter, which is packed with grains of pumice stone and which is heated in such a manner that the temperature in the first zone amounts to 160° C., in the second to 190° C. and in the third to 220° C. is evacuated to an internal pressure of 15 millimetres of mercury and olive oil fatty acid (acid value 180) and glycerol are added at such a rate that during the course of 2 hours 500 parts of olive oil fatty acid are introduced into the first zone and 100 parts of glycerol into the second zone. The reaction product which runs off at the bottom of the tower is free from glycerol and consists to the extent of over 96 per cent of neutral oil. The remainders of glycerol are carried off together with water vapour and can be recovered in any suitable manner.

What we claim is:—

1. The process for the production of esters of fatty acids and polyhydric alcohols which comprises causing the acid and the alcohol to be esterified to flow in the liquid state over solid inert bodies possessing a large superficial area, while heating.

2. The process for the production of esters of fatty acids and polyhydric alcohols, which comprises causing the acid and the alcohol to be esterfied to flow in the liquid state over solid inert bodies possessing a large superficial area, while heating, the component of lower boiling point being present in a quantity in excess of that required for complete esterification of the other component.

3. The process for the production of esters of fatty acids and polyhydric alcohols, which comprises causing the acid and the alcohol to be esterified to flow in the liquid state over solid inert porous bodies possessing a large superficial area, while heating.

4. The process for the production of esters of fatty acids and polyhydric alcohols, which comprises causing the acid and the alcohol to be esterified to flow in the liquid state over solid inert bodies possessing a large superficial area in the presence of a catalytic substance capable of accelerating the esterification, while heating.

5. The process for the production of esters of fatty acids, which comprises causing a higher fatty acid and polyhydric alcohols and a polyhydric alcohol to flow in the liquid state over solid inert bodies possessing a large superficial area, while heating.

6. The process for the production of esters of fatty acids and polyhydric alcohols, which comprises causing a higher fatty acid and glycerol to flow in the liquid state over solid inert bodies possessing a large superficial area, while heating.

7. The process for the production of esters of fatty acids and polyhydric alcohols, which comprises causing the acid and the alcohol to be esterified to flow in the liquid state over solid inert bodies possessing a large superficial area at a temperature above the boiling point of the component of lower boiling point but below the boiling point of the component of higher boiling point at the pressure employed.

8. The process for the production of esters of higher fatty acids and polyhydric alcohols, which comprises introducing the component of lower boiling point in the liquid state into about the middle zone of a column of the component of higher boiling point contained in a suitable vessel and heated to a temperature near the boiling point of the component of lower boiling point, in the presence of solid inert bodies of a large superficial area, a zone below the said middle zone being heated to a temperature above that of the said middle zone, but below the temperature of decomposition of the organic substances present.

9. The process for the production of esters of higher fatty acids and polyhydric alcohols, which comprises introducing the component of lower boiling point in the liquid state into about the middle zone of a column of the component of higher boiling point contained in a suitable vessel and heated to a temperature near the boiling point of the component of lower boiling point, in the presence of solid inert bodies of a large superficial area, a zone below the said middle zone being heated to a temperature above that of the said middle zone, but below the temperature of decomposition of the organic substances present, and a zone above the said middle zone being heated at least to a temperature above the boiling point of water at the pressure employed.

10. An apparatus for carrying out the process claimed in claim 8, which comprises a tubular closed reaction vessel provided with subdivided heating devices for heating different portions of the said vessel to different temperatures and filled with inert filler bodies of large superficial area, the top of the said vessel being provided with a short inlet pipe and with an inlet pipe reaching about into the middle space of the said vessel which vessel is provided with an outlet pipe each at its bottom and near its top.

11. The process of forming a fatty acid ester which comprises effecting the esterification in a tower having a plurality of superposed interconnected zones by introducing the acid into the uppermost zone while heating this zone to a temperature above the boiling point of water to prevent the condensation of water therein, introducing the alcohol into the next succeeding zone while heating this zone to a temperature above the boiling point of the alcohol, causing the alcohol to contact the descending acid while finely dividing the acid and imparting a large surface area of contact thereto to thereby effect interreaction of the acid and alcohol, causing the reaction mixture to flow into the lowermost zone while imparting a large surface area of contact to the constituents thereof and heating this zone to a temperature higher than that of the preceding zone, but below the decomposition point of the constituents of the mixture to complete the esterification of the acid and alcohol contained in said mixture.

12. A process as defined in claim 11 wherein the esterification is carried out under a reduced pressure.

13. The process of forming a glyceride of olive oil fatty acid which comprises effecting the esterification in a tower having three superposed interconnected zones by introducing the acid into the uppermost zone while heating this zone to about 160° C., introducing the glycerol into the next succeeding zone while heating this zone to about 190° C., causing the glycerol to contact the descending acid while finely dividing the acid and imparting a large surface area of contact thereto to thereby effect interreaction of the acid and glycerol, causing the reaction mixture to flow into the lowermost zone while imparting a large surface area of contact to the constituents thereof and heating this zone to a temperature of about 220° C. to complete esterification of the acid and glycerol contained in said mixture, the three zones being maintained under a pressure of about 15 millimetres during the process.

In testimony whereof we have hereunto set our hands.

ROBERT HELD.
MARTIN LUTHER.